United States Patent Office 3,384,458
Patented May 21, 1968

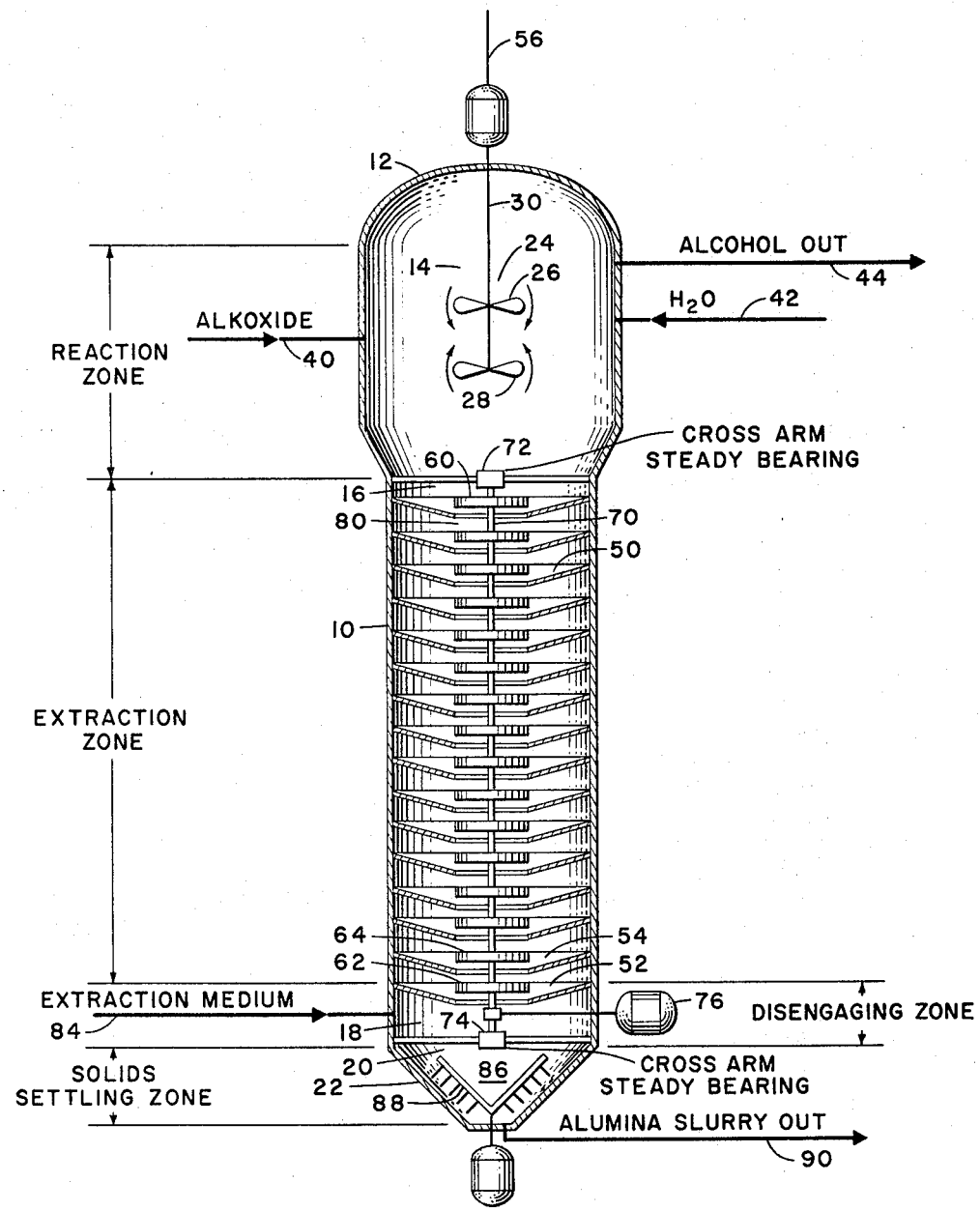

3,384,458
WATER HYDROLYSIS REACTOR FOR
MAKING ALUMINA
John Walton McCarthy and Sydney V. Stern, Ponca City, Okla., assignors to Continental Oil Company, Ponca City, Okla., a corporation of Delaware
Filed June 16, 1965, Ser. No. 464,347
7 Claims. (Cl. 23—283)

ABSTRACT OF THE DISCLOSURE

A combination reaction-extraction-settling vessel is provided, comprising an upper agitated reaction section, a central extraction section containing rotary disperser plates, and a lower settling and solids-removal section.

This invention relates to a reactor for making a finely divided solid product through chemical reaction in a liquid medium, e.g. the reaction of aluminum alkoxide and water to make alumina.

In the manufacture of a solid by the reaction of compounds in a liquid medium, the solid has a very large surface per unit weight because of its small particle size. Liquid medium adheres to this surface, contaminating the product. The adhered medium can be removed by washing (extracting) the solids with a solvent for the medium. In at least one process, it is economically important to recover the adhered liquid. The present equipment for this purpose is inefficient.

Because of their small particle size there is a substantial loss of solids along with the product and the extraction medium in the present equipment.

Present equipment utilizes many vessels for carrying out the necessary reaction, decantation separation of product, extraction of solid product and concentration of solid product into a thick slurry.

An object of this invention is a reaction vessel for the above purposes, incorporating the reaction, decantation, extraction and concentration operations in a single vessel affording multiple zones.

An especial object of the invention is such a reaction vessel for making alumina by the reaction of aluminum alkoxide and water.

Another especial object of this invention is such a reaction vessel which permits making alumina of specified particle size from a particular reaction vessel.

Another object of the invention is a method of reacting aluminum alkoxide and water to make essentially alcohol-free alumina product.

Other objects of the invention will become apparent in the course of the detailed description of the invention.

The single figure shows a vertical section of a preferred embodiment of the reaction vessel of the invention.

The reaction vessel of the invention comprises:

An elongated vertical shell including in superposed relation a reaction zone positioned at the top portion of said shell, an extraction zone in direct communication with and of a substantially smaller cross-sectional area than said reaction zone, a solids disengaging zone in direct communication with said reaction zone, and a solids settling zone in the bottom portion of said shell in direct communication with said disengaging zone;

Said shell being provided with ingress means for reactants and egress means for liquid product;

Agitator means positioned within said reaction zone affording vigorous stirring of a liquid reaction medium wheren a finely divided solid precipitate is formed;

Said extraction zone comprising a plurality of annular plates and rotatable dispersers positioned above each annular plate and in coaxial relation with said shell;

Said shell being provided with ingress means for liquid extraction medium positioned below said extraction zone and above said settling zone; and Said settling zone being shaped to provide a thick slurry body of solids and including a solids discharge means for withdrawing slurry while maintaining a thick slurry body of solids in said settling zone.

The invention is described in connection with, but is not limited to, the figure which forms a part of this specification. It is to be understood the figure is substantially schematic; details can be readily supplied by workers in this art.

The reaction vessel 10 comprises an elongated vertical shell 12, desirably cylindrical. Shell 12 contains in superposed relation four zones, namely, (1) at the top portion of shell 12 a reaction zone 14 wherein a reaction takes place in a liquid reaction medium to form a solid precipitate, (2) extraction zone 16 immediately below reaction zone 14 wherein the solid precipitate is extracted (washed) to remove adhered liquid from zone 14, (3) a solids disengaging zone 18 immediately below extraction zone 16 where the solid is able to settle out of the extraction medium, and (4) in the bottom portion of shell 12 immediately below zone 18 a solids settling zone 20 which is shaped, preferably an approximate conical shape 22, to provide a thick slurry (body compact) of solids therein.

Reaction zone 14 has positioned therein agitator means 24 which afford vigorous stirring of the liquid reaction medium filling zone 14. Agitator means 24 provides stirring vigorous enough at the particular reaction temperature to give a rapid reaction rate. Desirably agitator means 24 comprises two propellor agitators 26 and 28 arranged to direct liquid flow therein. Preferably agitator means 24 comprises, as shown in the figure, dual propeller blades 26 and 28 arranged on a common shaft 30; said propellor blades be pitched to pull liquid into the space between the blades, as shown in the figure.

Shell 12 in reaction zone 14 is provided with ingress means for reactants and egress means for liquid product; herein, aluminum alkoxide is introduced by way of conduit 40, water is introduced by way of conduit 42 and alcohol product is withdrawn by way of conduit 44. Preferably conduits 40 and 42 are positioned so that the reactants are directed toward the space between blades 26 and 28 in order to shorten the hydrolysis time and to avoid entrainment of the fluffy alumina precipitate into the alcohol product stream, by giving the precipitate a downward "push."

Reaction zone 14 has a substantially larger cross-sectional area than does extraction zone 16. This enlargement decreases the fluid flow rate in zone 14 and aids in decreasing the entrainment of solids into the product stream 44.

Extraction zone 16 is immediately below and in direct communication with, i.e., opens directly into reaction zone 14. Zone 16 includes a plurality of annular plates 50, 52, 54, etc.; preferably these annular plates are fixed to the periphery of the shell 12 and are inclined downwardly toward the vertical axis 56 of vessel 10. The slope is sufficient to aid the flow downwardly of the solids forced into the space between immediately adjacent annular plates, e.g., 52 and 54. The annular plates may be perforate or imperforate, desirably the latter.

Rotatable dispersers 60, 62, 64, etc., are positioned above each annular plate 50, 52, 54, etc., respectively. In this embodiment, all the dispersers except 60 are positioned intermediately of adjacent annular plates. The dispersers are in coaxial relation with shell 12; herein dispersers 60, 62, 64, etc., are positioned on a shaft 70, held in cross-arm steady bearings 72 and 74, which is driven by motor 76.

Preferably the dispersers are blades, e.g., turbine, paddle or bar, and have an effective length slightly larger than center opening 80 of the annular plates.

Disengaging zone 18 is immediately below and in direct communication with i.e., opens directly into, extraction zone 16. Ingress means 84 provide an entry for liquid extraction medium. Desirably the entry point is near the upper portion of zone 18 to afford a longer disengaging distance for the solids to concentrate as they fall into solids settling zone 20 which is immediately below and in direct communication with zone 18.

Settling zone 20 is shaped to provide a thick slurry body (compact) of solids which acts to prevent by-passing of liquid through the solids discharge means 86.

Solids discharge means 86 includes means for withdrawing slurry while maintaining a thick slurry body of solids in zone 20. Herein a rake 88 rotates against conical sides 22 to move the compacted solids out into the discharge conduit 90. The speed of rotation of rake 88 is such that the compact is maintained at the amount needed to avoid liquid by-passing.

The operation of vessel 10 is described in connection with the manufacture of alumina from aluminum alkoxide having 11–14 carbon atoms in each alkoxy group, in a vessel having an internal diameter of the extraction zone 16 of about seven feet. Water and alkoxide are introduced about midway dual contra-pitched propellors 26 and 28; reaction zone 14 is maintained at a temperature in the range of 140°–230° F. and a pressure in the range of about 15–90 p.s.i.a. The particular temperature is determined by the alkoxide, the rate of hydrolysis desired and the alumina crystal size desired; the pressure is determined by the need to maintain the extraction solvent liquid at the particular temperature. In general shaft 30 is rotated at about 5–100 r.p.m. to provide the vigorous agitation and downward push on the alumina particles formed by the alkoxide-water reaction.

Annular plates 50 etc. are affixed to the periphery of shell 12, are imperforate, are inclined downwardly and have a central aperture of about 2.5 feet. Dispersers 60, etc. are single bars about 2.5 feet long positioned midway between immediately adjacent plates. A gentle dispersing movement is imparted to the thin slurry in zone 16 by having dispersers 60 rotate at about 5–20 r.p.m.; the alumina solids and extraction liquid, e.g., butanol, are thoroughly intermingled as the bars force the thin slurry between the plates and the solids settle and slide from the inclined plate to the center opening.

The solids settle out of the extraction liquid and form a thick slurry essentially free of product alcohol, e.g., 1% or less; this compact is raked at a slow speed to discharge thick slurry at about the rate at which this builds up in order to maintain a condition wherein by-passing of solvent butanol is essentially eliminated.

The reactor of the invention provides the following advantages and benefits:

(1) Initial investment and operating costs are substantially reduced by eliminating the extra foundations, pumps, piping, valves, and instruments required for multi-vessel designs.

(2) Alumina carry-over in the decanted product alcohol stream is reduced.

(3) Complete conversion of aluminum alkoxides is insured by providing high water concentrations and efficient mixing in the region of alkoxide injection.

(4) High product alcohol recoveries are provided by efficient intimate countercurrent contacting of the alumina with the extraction medium using stagewise, agitated contacting compartments.

(5) Alumina buildup in the compartments and the possibility of plugging during operation is prevented by the agitation in the extraction section; the sloping interstate baffles allow disengagement of the alumina and solvent and, at the same time, further minimize plugging tendencies.

(6) The conical disengaging section at the bottom of the column allows the alumina to settle more readily and to compact thus permitting a more concentrated slurry to be withdrawn with subsequent drying and/or filtration savings. A slowly revolving rake in the bottom of the disengaging section prevents liquid bypassing through the thickened slurry.

Thus having described the invention, what is claimed is:

1. A reaction vessel comprising:
    an elongated vertical shell including in superposed relation a reaction section positioned at the top portion of said shell, an extraction section in direct communication with and of a substantially smaller cross-sectional area than said reaction section, a solids disengaging section in direct communication with said reaction section, and a solids settling section in the bottom portion of said shell in direct communication with said disengaging section;
    said shell being provided with ingress means for reactants and egress means for liquid product;
    agitator means positioned within said reaction section affording vigorous stirring of a liquid reaction medium wherein a solid precipitate is formed;
    said extraction section comprising a plurality of annular plates and rotatable dispersers positioned above each annular plate and in coaxial relation with said shell;
    said shell being provided with ingress means for liquid extraction medium positioned below said extraction section and above said settling section; and
    said settling section being shaped to provide a thick slurry body of solids and including a solids discharge means for withdrawing slurry while maintaining a thick slurry body of solids in said settling section.

2. The vessel of claim 1 wherein said annular plates are inclined downwardly toward the vertical axis of said shell.

3. The vessel of claim 1 where said dispersers are blades of a length approximating the size of the center aperture of said annular plates.

4. The vessel of claim 1 wherein said settling section is approximately a conical shape.

5. A reaction vessel adapted for the production of finely divided alumina particles by decomposition of an aluminum alkoxide, which vessel comprises:
    an elongated vertical cylindrical shell including, in superposed, direct communicating relation, a reaction section at the top portion of said shell for reacting alkoxide and water, an extraction section of substantially smaller cross-sectional area than said reaction section for removing liquid reaction product from finely divided solid alumina reaction product, a solids disengaging section for solid alumina separation from liquid medium, and a substantially conical bottom portion for maintaining a thick slurry compact of solid alumina particles;
    said reaction section being provided with dual propeller agitation affording vigorous agitation of the contents of said reaction section, said propellers being on a common axis and arranged to direct liquid flow between said propellers;
    said reaction section being provided with ingress means for reactants, directing said reactants toward the region between said propellers, and with egress means for withdrawal;
    said settling section including a solids discharge means for withdrawing a thick slurry from said settling section while maintaining a thick slurry compact therein.

6. The vessel of claim 5 wherein said egress means includes a rotating rake.

7. A reaction vessel comprising:
    an elongated vertical shell including in superposed relation a reaction section positioned at the top portion of said shell, an extraction section in direct communication with and of a substantially smaller cross-sectional area than said reaction section, a solids disengaging section in direct communication with said reaction section, and a solids settling section in the bottom portion of said shell in direct communication with said disengaging section;

said shell being provided with ingress means for reactants and egress means for liquid product;

agitator means comprising two propeller agitators on a common axis arranged to direct liquid flow between said propellers and positioned within said reaction section, affording vigorous stirring of a liquid reaction medium;

said extraction zone comprising a plurality of annular plates and rotatable dispersers positioned above each annular plate and in coaxial relation with said shell;

said shell being provided with ingress means for liquid extraction medium positioned below said extraction zone and above said settling zone; and said settling section being shaped to provide a thick slurry body of solids and including a solids discharge means for withdrawing slurry while maintaining a thick slurry body of solids in said settling section.

References Cited

UNITED STATES PATENTS

| | | | |
|---|---|---|---|
| 3,156,534 | 11/1964 | Josephson et al. | 23—283 |
| 3,072,464 | 1/1963 | Akaboshi et al. | 23—283 |

FOREIGN PATENTS 1,001,663  1/1957  Germany.

JAMES H. TAYMAN, JR., *Primary Examiner.*